(12) United States Patent
Zhang

(10) Patent No.: US 10,257,823 B2
(45) Date of Patent: Apr. 9, 2019

(54) TRAINING RESOURCE ALLOCATION METHOD, APPARATUS, AND SYSTEM

(71) Applicant: Huawei Technologies Co., Ltd., Shenzhen (CN)

(72) Inventor: Xiaofeng Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 178 days.

(21) Appl. No.: 15/047,761

(22) Filed: Feb. 19, 2016

(65) Prior Publication Data

US 2016/0174223 A1 Jun. 16, 2016

Related U.S. Application Data

(63) Continuation of application No. PCT/CN2013/081838, filed on Aug. 20, 2013.

(51) Int. Cl.
 H04W 72/08 (2009.01)
 H04W 72/04 (2009.01)
 H04L 5/00 (2006.01)

(52) U.S. Cl.
 CPC ....... H04W 72/0446 (2013.01); H04L 5/0005 (2013.01); H04L 5/0048 (2013.01); H04L 5/0078 (2013.01)

(58) Field of Classification Search
 CPC .............................. H04W 72/04; H04W 28/16
 See application file for complete search history.

(56) References Cited

U.S. PATENT DOCUMENTS

2004/0218682 A1 11/2004 Nam et al.
2009/0034468 A1* 2/2009 Muharemovic ... H04W 72/1273
370/330

(Continued)

FOREIGN PATENT DOCUMENTS

CN 1688145 A 10/2005
CN 1951139 A 4/2007
(Continued)

OTHER PUBLICATIONS

"Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Computer Society, IEEE Std 802.3ah, Sep. 7, 2004, 640 pages.

"Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks," IEEE Computer Society, IEEE Std 802.3av, Oct. 30, 2009, 236 pages.

(Continued)

*Primary Examiner* — Brandon M Renner
(74) *Attorney, Agent, or Firm* — Conley Rose, P.C.

(57) ABSTRACT

A training resource allocation method and apparatus includes obtaining a training resource block through division for a frequency band within a resource allocation period, determining user equipment eligible to occupy the training resource block, where the user equipment are corresponding to an uplink data time-frequency resource already allocated to the frequency band, and determining, according to at least one of a duration for which user equipment occupies the frequency band within the resource allocation period and a duration of user equipment band from a previous time of occupation of a training resource block in the frequency, from the user equipment eligible to occupy the training resource block, user equipment that occupies the training resource block, and allocating the training resource block to the user equipment.

15 Claims, 3 Drawing Sheets

(56) References Cited

U.S. PATENT DOCUMENTS

| | | | | |
|---|---|---|---|---|
| 2010/0020889 | A1* | 1/2010 | Tamaki | H04L 5/0044 |
| | | | | 375/260 |
| 2010/0099429 | A1* | 4/2010 | Ishii | H04W 72/1268 |
| | | | | 455/452.1 |
| 2011/0002319 | A1* | 1/2011 | Husen | H04W 72/042 |
| | | | | 370/338 |
| 2011/0116516 | A1 | 5/2011 | Hwang et al. | |
| 2011/0267960 | A1 | 11/2011 | Beale et al. | |
| 2011/0310786 | A1* | 12/2011 | Qin | H04L 5/0032 |
| | | | | 370/312 |
| 2012/0071188 | A1* | 3/2012 | Wang | H04W 16/14 |
| | | | | 455/509 |
| 2012/0076115 | A1 | 3/2012 | Noh et al. | |
| 2012/0307772 | A1 | 12/2012 | Kwon et al. | |
| 2013/0267222 | A1* | 10/2013 | Park | H04B 7/0619 |
| | | | | 455/422.1 |
| 2013/0272274 | A1* | 10/2013 | Ishida | H04W 72/082 |
| | | | | 370/336 |
| 2015/0373740 | A1* | 12/2015 | Eriksson | H04W 74/0833 |
| | | | | 370/329 |

FOREIGN PATENT DOCUMENTS

| | | |
|---|---|---|
| CN | 101384066 A | 3/2009 |
| CN | 101547022 A | 9/2009 |
| WO | 2012146188 A1 | 11/2012 |

OTHER PUBLICATIONS

"Series G: Transmission Systems and Media, Digital Systems and Networks, Digital Sections and Digital line system—Access networks, Very high speed digital subscriber line transceivers 2 (VDSL2) Amendment 3," ITU-T, G.993.2, Amendment 3, Apr. 2013, 26 pages.

Foreign Communication From a Counterpart Application, PCT Application No. PCT/CN2013/081838, English Translation of International Search Report dated May 28, 2014, 2 pages.

Foreign Communication From a Counterpart Application, PCT Application No. PCT/CN2013/081838, English Translation of International Search Report dated May 28, 2014, 6 pages.

Motorola: "LTE-A Dynamic Aperiodic SRS—Triggering, Duration, Timing, and Carrier Aggregation," 3GPP TSG RAN WG1 Meeting #61, R1-103187, May 10-14, 2010, 4 pages.

Foreign Communication From a Counterpart Application, European Application No. 13891777.8, Extended European Search Report dated Jun. 17, 2016, 9 pages.

Machine Translation and Abstract of Chinese Publication No. CN101384066, Mar. 11, 2009, 11 pages.

Machine Translation and Abstract of Chinese Publication No. CN101547022, Sep. 30, 2009, 22 pages.

Foreign Communication From a Counterpart Application, Chinese Application No. 201380000995.5, Chinese Office Action dated Aug. 4, 2017, 5 pages.

* cited by examiner

TRAINING RESOURCE ALLOCATION METHOD, APPARATUS, AND SYSTEM

CROSS-REFERENCE TO RELATED APPLICATIONS

This application is a continuation of International Application No. PCT/CN2013/081838, filed on Aug. 20, 2013, which is hereby incorporated by reference in its entirety.

TECHNICAL FIELD

The present disclosure relates to the field of communications technologies, and in particular, to a training resource allocation method, apparatus, and system.

BACKGROUND

At present, there are two common training resource allocation methods. The first method is occupying an entire available frequency band within an exclusive period of time to perform channel training of uplink user equipment. The second method is randomly or regularly selecting, in a slot of an uplink data time-frequency resource, a resource block of a minimal granularity on a time-frequency resource to perform channel training of uplink user equipment.

The first training resource allocation method is not applicable to a point-to-multipoint system. In a point-to-multipoint system, the method affects service quality of another user equipment. The second training resource allocation method is applicable to a point-to-multipoint system; however, because the resource block of the minimal granularity on the time-frequency resource is selected to perform the channel training of the uplink user equipment, a relatively large quantity of time-frequency resources are required, and the method causes that a relatively large error exists in the channel training, resulting in low spectrum efficiency.

SUMMARY

In view of this, the present disclosure provides a training resource allocation method, apparatus, and system, where the training resource allocation method and apparatus are applicable to a point-to-multipoint system, and a relatively small quantity of time-frequency resources can be used to implement accurate uplink channel training, thereby improving spectrum utilization.

According to a first aspect, an embodiment of the present disclosure provides a training resource allocation method, where the method includes, obtaining a training resource block through division for a frequency band within a resource allocation period, determining user equipment eligible to occupy the training resource block, where the user equipment are corresponding to an uplink data time-frequency resource already allocated to the frequency band, and determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block, and allocating the training resource block to the user equipment.

In a first possible implementation manner of the first aspect, the obtaining a training resource block through division for the frequency band is further comprising dividing, based on a width of the frequency band, one time domain symbol or several consecutive time domain symbols within the resource allocation period into at least one resource block, where each resource block in the at least one resource block is a training resource block in a frequency band in which the resource block is located.

With reference to the first possible implementation manner of the first aspect, in a second possible implementation manner, the one time domain symbol or several consecutive time domain symbols are located at a beginning part of the resource allocation period.

With reference to the first aspect or the first possible implementation manner of the first aspect or the second possible implementation manner of the first aspect, in a third possible implementation manner, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block further includes allocating the training resource block to user equipment, occupying the frequency band for the longest duration within the resource allocation period, in the user equipment eligible to occupy the training resource block.

With reference to the third possible implementation manner of the first aspect, in a fourth possible implementation manner, when the user equipment eligible to occupy the training resource block occupy the frequency band for same duration within the resource allocation period, the training resource block is allocated to user equipment, having the longest duration from a previous time of occupation of a training resource block in the frequency band, in the user equipment eligible to occupy the training resource block.

With reference to the first aspect or the first possible implementation manner of the first aspect or the second possible implementation manner of the first aspect, in a fifth possible implementation manner, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block further includes allocating the training resource block to user equipment, having the longest duration from a previous time of occupation of a training resource block in the frequency band, in the user equipment eligible to occupy the training resource block.

With reference to the fifth possible implementation manner of the first aspect, in a sixth possible implementation manner, when the user equipment eligible to occupy the training resource block have same duration from a previous time of occupation of a training resource block in the frequency band, the training resource block is allocated to user equipment, occupying the frequency band for the longest duration within the resource allocation period, in the user equipment eligible to occupy the training resource block.

With reference to the first aspect or the first possible implementation manner of the first aspect or the second possible implementation manner of the first aspect, in a seventh possible implementation manner, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block is further determine whether duration for which each user equipment in the user equipment eligible to occupy the training resource block occupies the frequency band within the resource allocation period exceeds a preset first time threshold; determining whether duration of each user equipment, in the user equipment eligible to occupy the training resource block, from a previous time of occupation of a training resource block in the frequency band exceeds a preset second time threshold. If the user equipment eligible to occupy the training resource block include user equipment that occupies the frequency band within the resource allocation period for duration exceeding the first time threshold and do not include user equipment having duration, from a previous time of occupation of a training resource block in the frequency band, exceeding the second time threshold, allocating the training resource block to user equipment, occupying the frequency band for the longest duration within the resource allocation period, in the user equipment eligible to occupy the training resource block, and if the user equipment eligible to occupy the training resource block include user equipment having duration, from a previous time of occupation of a training resource block in the frequency band, exceeding the second time threshold and do not include user equipment that occupies the frequency band within the resource allocation period for duration exceeding the first time threshold, allocating the training resource block to user equipment, having the longest duration from a previous time of occupation of a training resource block in the frequency band, in the user equipment eligible to occupy the training resource block.

According to a second aspect, an embodiment of the present disclosure provides a training resource allocation apparatus, where the apparatus includes a dividing unit configured to obtain a training resource block through division for a frequency band within a resource allocation period; a determining unit configured to determine user equipments eligible to occupy the training resource block, where the user equipment are corresponding to an uplink data time-frequency resource already allocated to the frequency band; and an allocation unit configured to determine, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block, and allocate the training resource block to the user equipment.

In a first possible implementation manner of the second aspect, the dividing unit is further configured to divide, based on a width of the frequency band, one time domain symbol or several consecutive time domain symbols within the resource allocation period into at least one resource block, where each resource block in the at least one resource block is a training resource block in a frequency band in which the resource block is located.

With reference to the first possible implementation manner of the second aspect, in a second possible implementation manner, the one time domain symbol or several consecutive time domain symbols are located at a beginning part of the resource allocation period.

With reference to the second aspect or the first possible implementation manner of the second aspect or the second possible implementation manner of the second aspect, in a third possible implementation manner, the allocation unit is further configured to allocate the training resource block to user equipment, occupying the frequency band for the longest duration within the resource allocation period, in the user equipment eligible to occupy the training resource block.

With reference to the third possible implementation manner of the second aspect, in a fourth possible implementation manner, the allocation unit is further configured to, when the user equipment eligible to occupy the training resource block occupy the frequency band for same duration within the resource allocation period, allocate the training resource block to user equipment, having the longest duration from a previous time of occupation of a training resource block in the frequency band, in the user equipment eligible to occupy the training resource block.

With reference to the second aspect or the first possible implementation manner of the second aspect or the second possible implementation manner of the second aspect, in a fifth possible implementation manner, the allocation unit is further configured to allocate the training resource block to user equipment, having the longest duration from a previous time of occupation of a training resource block in the frequency band, in the user equipment eligible to occupy the training resource block.

With reference to the fifth possible implementation manner of the second aspect, in a sixth possible implementation manner, the allocation unit is further configured to, when the user equipment eligible to occupy the training resource block have same duration from a previous time of occupation of a training resource block in the frequency band, allocate the training resource block to user equipment, occupying the frequency band for the longest duration within the resource allocation period, in the user equipment eligible to occupy the training resource block.

With reference to the second aspect or the first possible implementation manner of the second aspect or the second possible implementation manner of the second aspect, in a seventh possible implementation manner, the allocation unit is further configured to determine whether duration for which each user equipment in the user equipment eligible to occupy the training resource block occupies the frequency band within the resource allocation period exceeds a preset first time threshold, determine whether duration of each user equipment, in the user equipment eligible to occupy the training resource block, from a previous time of occupation of a training resource block in the frequency band exceeds a preset second time threshold. If the user equipment eligible to occupy the training resource block include user equipment that occupies the frequency band within the resource allocation period for duration exceeding the first time threshold and do not include user equipment having duration, from a previous time of occupation of a training resource block in the frequency band, exceeding the second time threshold, allocate the training resource block to user equipment, occupying the frequency band for the longest duration within the resource allocation period, in the user equipment eligible to occupy the training resource block, and if the user equipment eligible to occupy the training resource block include user equipment having duration, from a previous time of occupation of a training resource block in the frequency band, exceeding the second time threshold and do not include user equipment that occupies the frequency band within the resource allocation period for duration exceeding the first time threshold, allocate the training resource block to user equipment, having the longest duration from a previous time of occupation of a training resource block in the frequency band, in the user equipment eligible to occupy the training resource block.

According to a third aspect, an embodiment of the present disclosure provides a network device, where the network device includes a processor and a memory, where the memory is configured to store program code, and the processor is configured to invoke the program code in the memory, to execute the following operations: obtaining a training resource block through division for a frequency band within a resource allocation period, determining user equipment eligible to occupy the training resource block, where the user equipment are corresponding to an uplink data time-frequency resource already allocated to the frequency band, and determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block, and allocating the training resource block to the user equipment.

In a first possible implementation manner of the third aspect, the obtaining a training resource block through division for a frequency band within a resource allocation period further includes dividing, based on a width of the frequency band, one time domain symbol or several consecutive time domain symbols within the resource allocation period into at least one resource block, where each resource block in the at least one resource block is a training resource block in a frequency band in which the resource block is located.

With reference to the first possible implementation manner of the third aspect, in a second possible implementation manner, the one time domain symbol or several consecutive time domain symbols are located at a beginning part of the resource allocation period.

With reference to the third aspect or the first possible implementation manner of the third aspect or the second possible implementation manner of the third aspect, in a third possible implementation manner, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block includes allocating the training resource block to user equipment, occupying the frequency band for the longest duration within the resource allocation period, in the user equipment eligible to occupy the training resource block.

With reference to the third possible implementation manner of the third aspect, in a fourth possible implementation manner, when the user equipment eligible to occupy the training resource block occupy the frequency band for same duration within the resource allocation period, the training resource block is allocated to user equipment, having the longest duration from a previous time of occupation of a training resource block in the frequency band, in the user equipment eligible to occupy the training resource block.

With reference to the third aspect or the first possible implementation manner of the third aspect or the second possible implementation manner of the third aspect, in a fifth possible implementation manner, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block is further includes allocating the training resource block to user equipment, having the longest duration from a previous time of occupation of a training resource block in the frequency band, in the user equipment eligible to occupy the training resource block.

With reference to the fifth possible implementation manner of the third aspect, in a sixth possible implementation manner, when the user equipment eligible to occupy the training resource block have same duration from a previous time of occupation of a training resource block in the frequency band, the training resource block is allocated to user equipment, occupying the frequency band for the longest duration within the resource allocation period, in the user equipment eligible to occupy the training resource block.

With reference to the third aspect or the first possible implementation manner of the third aspect or the second possible implementation manner of the third aspect, in a seventh possible implementation manner, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block is further includes determining whether duration for which each user equipment in the user equipment eligible to occupy the training resource block occupies the frequency band within the resource allocation period exceeds a preset first time threshold, determining whether duration of each user equipment, in the user equipment eligible to occupy the training resource block, from a previous time of occupation of a training resource block in the frequency band exceeds a preset second time threshold. If the user equipment eligible to occupy the training resource block include user equipment that occupies the frequency band within the resource allocation period for duration exceeding the first time threshold and do not include user equipment having duration, from a previous time of occupation of a training resource block in the frequency band, exceeding the second time threshold, allocating the training resource block to user equipment, occupying the frequency band for the longest duration within the resource allocation period, in the user equipment eligible to occupy the training resource block, and if the user equipment eligible to occupy the training resource block include user equipment having duration, from a previous time of occupation of a training resource block in the frequency band, exceeding the second time threshold and do not include user equipment that occupies the frequency band within the resource allocation period for duration exceeding the first time threshold, allocating the training resource block to user equipment, having the longest duration from a previous time of occupation of a training resource block in the frequency band, in the user equipment eligible to occupy the training resource block.

According to a fourth aspect, an embodiment of the present disclosure provides a training resource allocation system, where the system includes any one of the training resource allocation apparatuses according to the second aspect or any one of the network devices according to the third aspect, and at least one user equipment.

By means of the foregoing technical solutions, a training resource block is obtained through division for each frequency band within each resource allocation period, user equipment eligible to occupy the training resource block are determined according to user equipment corresponding to an uplink data time-frequency resource already allocated to the frequency band, and the training resource block is then allocated to user equipment in the user equipment eligible to occupy the training resource block. In the technical solutions, a training resource block is obtained through division for each frequency band within each resource allocation period. Therefore, impact of uplink channel training on other online users may be reduced. Moreover, history information may be effectively used to perform uplink channel training, that is, to perform uplink channel training of the some frequency bands on user equipment that uses a current frequency band. It can be accordingly seen that the foregoing technical solutions are applicable to a point-to-multipoint system, and a relatively small quantity of time-frequency resources can be used to implement accurate uplink channel training, thereby improving spectrum utilization.

DESCRIPTION OF EMBODIMENTS

To make the objectives, technical solutions, and advantages of the present disclosure clearer, the following further describes the present disclosure in detail with reference to the accompanying drawings. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
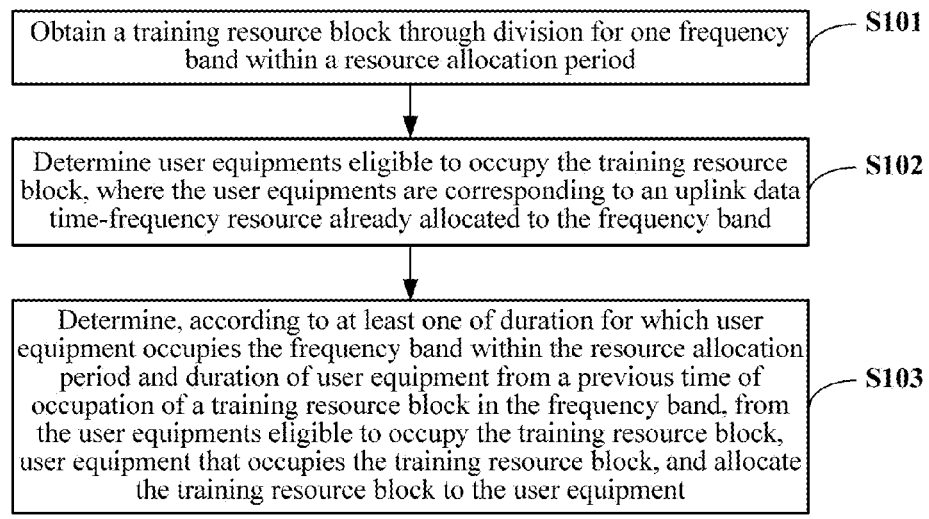
FIG. 1 is a schematic flowchart of a training resource allocation method according to Embodiment 1 of the present disclosure.

A training resource allocation method according to Embodiment 1 of the present disclosure is described in detail below using FIG. 1 as an example. FIG. 1 is a schematic flowchart of the training resource allocation method according to Embodiment 1 of the present disclosure. The training resource allocation method is performed by a network device, where the network device may be further a device such as a base station or an optical network terminal. As shown in FIG. 1, the training resource allocation method includes the following steps.

Step S101: Obtain a training resource block through division for one frequency band within a resource allocation period.

The network device obtains a corresponding training resource block through division for each frequency band within each resource allocation period at a channel training stage, so as to perform uplink channel training on user equipment that uses a frequency band within a resource allocation period.

A principle of obtaining a training resource block through division further comprises dividing, based on a width of the frequency band, one time domain symbol or several consecutive time domain symbols within the resource allocation period into at least one resource block, where each resource block in the at least one resource block is a training resource block in a frequency band in which the resource block is located.

Preferably, the one time domain symbol or several consecutive time domain symbols are located at a beginning part of the resource allocation period.

Figure 2:
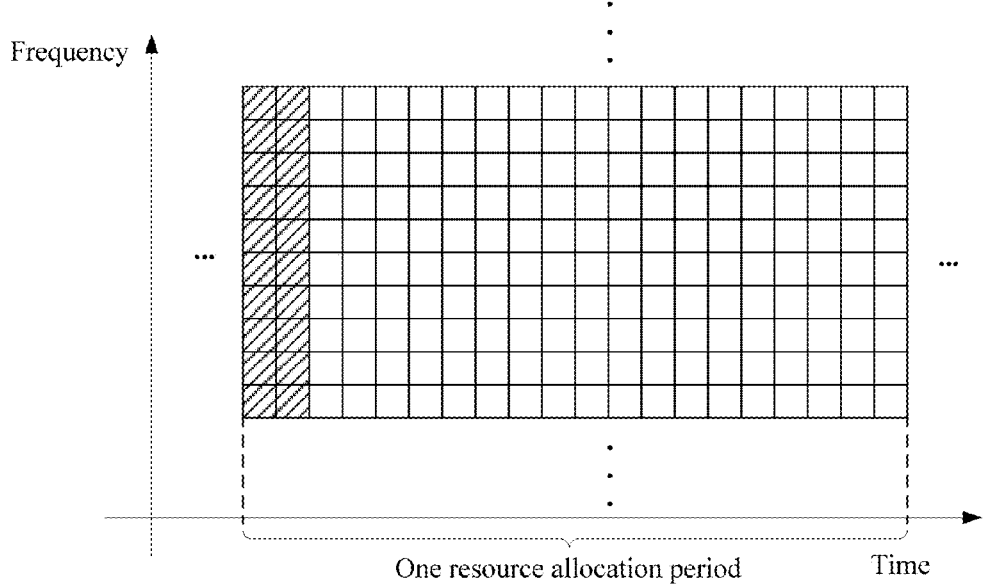
FIG. 2 is a schematic diagram of obtaining training resources through division according to Embodiment 1 of the present disclosure.

As shown in FIG. 2, a rectangle in FIG. 2 refers to all time-frequency resources within one resource allocation period. Each block represents a resource block of a minimal granularity on a time-frequency resource. That is, for one block, a width is one time domain symbol, and a height is a width of a frequency band. The network device may randomly divide, based on the width of the frequency band within the resource allocation period, one time domain symbol or several consecutive time domain symbols into at least one training resource block. Preferably, the one time domain symbol or several consecutive time domain symbols are located at a beginning part of the resource allocation period. As shown by the shaded areas in FIG. 2, within the resource allocation period, two consecutive time domain symbols are divided into multiple resource blocks based on the width of the frequency band, and two consecutive shaded resource blocks in each row are training resource blocks in a frequency band in which the two shaded resource blocks are located.

Step S102: Determine user equipment eligible to occupy the training resource block, where the user equipment are corresponding to an uplink data time-frequency resource already allocated to the frequency band.

Within each resource allocation period, one frequency band may be occupied by different user equipment within different periods of time, and therefore, user equipment that occupy a same frequency band at different periods of time within the resource allocation period are all eligible to occupy a training resource block in the frequency band. It can be determined according to an uplink data time-frequency resource already allocated to the frequency band whether user equipment occupies a frequency band within a period of time. Therefore, the network device determines user equipment eligible to occupy the training resource block, where the user equipment are corresponding to the uplink data time-frequency resource already allocated to the frequency band.

Step S103: Determine, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block, and allocate the training resource block to the user equipment.

Optionally, the training resource block in the frequency band is allocated to user equipment, occupying the frequency band for the longest duration within the resource allocation period, in the user equipment eligible to occupy the training resource block.

If the user equipment eligible to occupy the training resource block occupy the frequency band for same duration within the resource allocation period, the training resource block in the frequency band is allocated to user equipment, having the longest duration from a previous time of occupation of a training resource block in the frequency band, in the user equipment eligible to occupy the training resource block.

It should be noted that a training resource block occupied by user equipment at a previous time in the frequency band is a training resource block allocated within at least one previous resource allocation period. A training resource block is reallocated within each resource allocation period. Therefore, a training resource block occupied by user equipment at a previous time in the frequency band is different from a training resource block allocated within a current resource allocation period.

Figure 3:
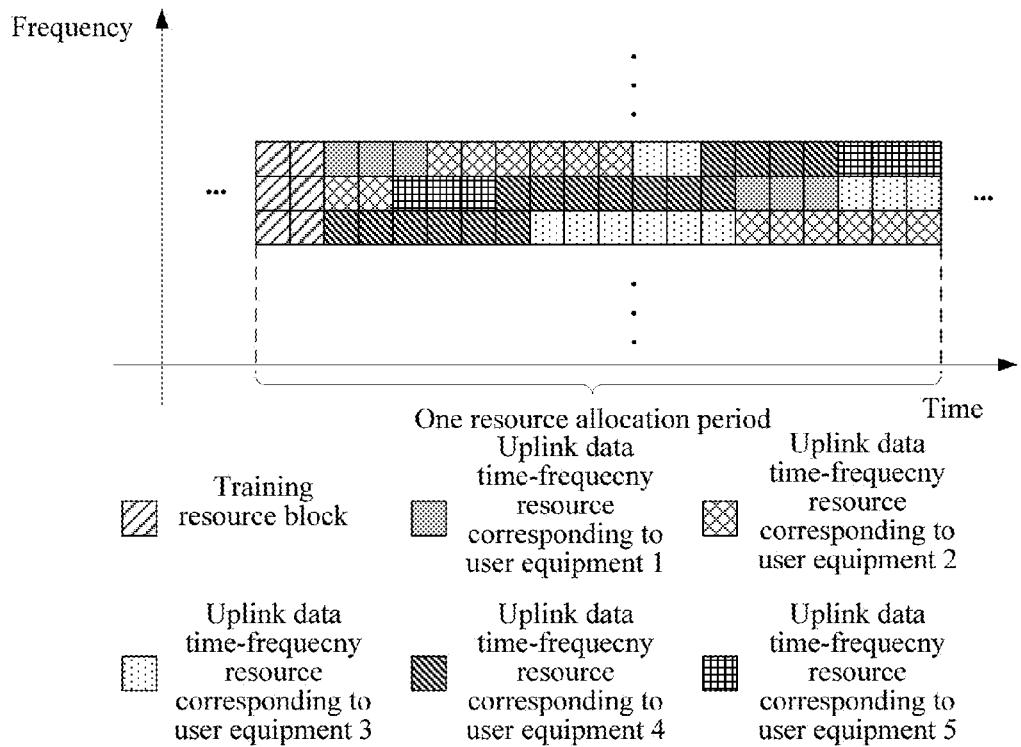
FIG. 3 is a schematic diagram of allocating training resources according to Embodiment 1 of the present disclosure.

In a specific example, as shown in FIG. 3, each row represents one frequency band. As can be seen from a frequency band in the first row, within a resource allocation period, the frequency band in the first row is separately occupied by user equipment 1, user equipment 2, user equipment 3, user equipment 4, and user equipment 5 at different periods of time, and therefore, the user equipment 1, the user equipment 2, the user equipment 3, the user equipment 4, and the user equipment 5 are all eligible to occupy a training resource block in the frequency band. The user equipment 2 occupies the frequency band for the longest duration within the resource allocation period, and therefore a training resource block in the frequency band in the first row is allocated to the user equipment 2. It can be seen from a frequency band in the third row that, within the resource allocation period, the frequency band in the third row is occupied by the user equipment 2, the user equipment 3, and the user equipment 4 at different periods of time, and therefore, the user equipment 2, the user equipment 3, and the user equipment 4 are all eligible to occupy a training resource block in the frequency band. Because the user equipment 2, the user equipment 3, and the user equipment 4 occupy the frequency band for same duration within the resource allocation period, a training resource block in the frequency band in the third row is allocated to user equipment, having the longest duration from a previous time of occupation of a training resource block in the frequency band in the third row, in the user equipment 2, the user equipment 3, and the user equipment 4. For frequency bands in other rows, a training resource block is allocated for each frequency band in a same manner.

It should be noted that although FIG. 3 does not show duration of the user equipment from a previous time of occupation of a training resource block in a frequency band in which the user equipment is located, the network device may learn, according to a previous training resource block allocation record, user equipment having the longest duration from a previous time of occupation of a training resource block in the frequency band in which the user equipment is located.

Optionally, duration for which the user equipment eligible to occupy the training resource block occupy the frequency band may be not considered, and the training resource block may be allocated based only on duration of the user equipment eligible to occupy the training resource block from a previous time of occupation of training resource blocks in the frequency band in which the user equipment are located.

The training resource block in the frequency band is allocated to user equipment, having the longest duration from a previous time of occupation of a training resource block in the frequency band, in the user equipment eligible to occupy the training resource block.

However, when the user equipment eligible to occupy the training resource block have same duration from a previous time of occupation of a training resource block in the frequency band, the training resource block may be allocated to user equipment, occupying the frequency band for the longest duration within the resource allocation period, in the user equipment eligible to occupy the training resource block.

Optionally, duration for which the user equipment eligible to occupy the training resource block occupy the frequency band and duration of the user equipment eligible to occupy the training resource block from a previous time of occupation of training resource blocks in the frequency band may be further considered in combination.

Furthermore, it is determined whether duration for which each user equipment in the user equipment eligible to occupy the training resource block occupies the frequency band within the resource allocation period exceeds a preset first time threshold. It is determined whether duration of each user equipment, in the user equipment eligible to occupy the training resource block, from a previous time of occupation of a training resource block in the frequency band exceeds a preset second time threshold. If the user equipment eligible to occupy the training resource block include user equipment that occupies the frequency band within the resource allocation period for duration exceeding the first time threshold and do not include user equipment having duration, from a previous time of occupation of a training resource block in the frequency band, exceeding the second time threshold, the training resource block is allocated to user equipment occupying the frequency band for the longest duration within the resource allocation period, in the user equipment eligible to occupy the training resource block. If the user equipment eligible to occupy the training resource block include user equipment having duration, from a previous time of occupation of a training resource block in the frequency band, exceeding the second time threshold and do not include user equipment that occupies the frequency band within the resource allocation period for duration exceeding the first time threshold, the training resource block is allocated to user equipment having the longest duration from a previous time of occupation of a training resource block in the frequency band, in the user equipment eligible to occupy the training resource block. If the user equipment eligible to occupy the training resource block do not include user equipment that occupies the frequency band within the resource allocation period for duration exceeding the first time threshold and do not include user equipment having duration, from a previous time of occupation of a training resource block in the frequency band, exceeding the second time threshold, or the user equipment eligible to occupy the training resource block include user equipment that occupies the frequency band within the resource allocation period for duration exceeding the first time threshold and also include user equipment having duration, from a previous time of occupation of a training resource block in the frequency band, exceeding the second time threshold, the training resource block is allocated to user equipment occupying the frequency band for the longest duration within the resource allocation period, in the user equipment eligible to occupy the training resource block. When the user equipment eligible to occupy the training resource block occupy the frequency band for same duration within the resource allocation period, the training resource block in the frequency band is allocated to user equipment having the longest duration from a previous time of occupation of a training resource block in the frequency band, in the user equipment eligible to occupy the training resource block, or is allocated to user equipment having the longest duration from a previous time of occupation of a training resource block in the frequency band, in the user equipment eligible to occupy the training resource block, and when the user equipment eligible to occupy the training resource block have same duration from a previous time of occupation of a training resource block in the frequency band, the training resource block may be allocated to user equipment occupying the frequency band for the longest duration within the resource allocation period, in the user equipment eligible to occupy the training resource block.

By means of the training resource allocation method according to Embodiment 1 of the present disclosure, a training resource block is obtained through division for each frequency band within each resource allocation period, user equipment eligible to occupy the training resource block are determined according to user equipment corresponding to an uplink data time-frequency resource already allocated to the frequency band, and the training resource block is then allocated to user equipment in the user equipment eligible to occupy the training resource block. In the method, a training resource block is obtained through division for each frequency band within each resource allocation period. Therefore, impact of uplink channel training on other online users can be reduced. Moreover, history information can be effectively used to perform uplink channel training, that is, to perform uplink channel training of the some frequency bands on user equipment that uses a current frequency band. It may be accordingly seen that the method is applicable to a point-to-multipoint system, and a relatively small quantity of time-frequency resources can be used to implement accurate uplink channel training, thereby improving spectrum utilization.

Figure 4:
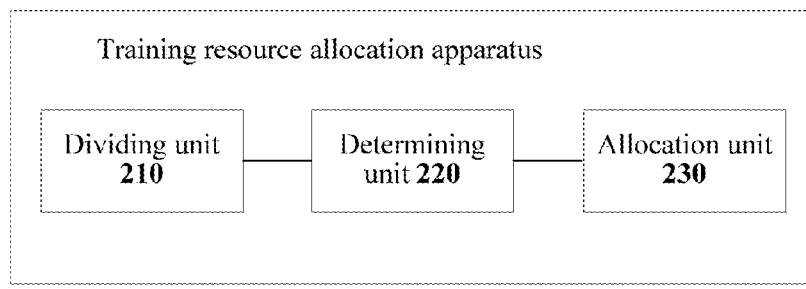
FIG. 4 is a schematic structural diagram of a training resource allocation apparatus according to Embodiment 2 of the present disclosure.

A training resource allocation apparatus according to Embodiment 2 of the present disclosure is described in detail below using FIG. 4 as an example. FIG. 4 is a schematic structural diagram of the training resource allocation apparatus according to Embodiment 2 of the present disclosure. The training resource allocation apparatus is applied to a network device, where the network device may be further a device such as a base station or an optical line terminal, and is configured to implement the training resource allocation method according to Embodiment 1.

As shown in FIG. 4, the training resource allocation apparatus includes a dividing unit 210, a determining unit 220, and an allocation unit 230.

The dividing unit 210 is configured to obtain a training resource block through division for a frequency band within a resource allocation period.

The dividing unit 210 obtains a corresponding training resource block through division for each frequency band within each resource allocation period at a channel training stage, so as to perform uplink channel training on user equipment that uses a frequency band within a resource allocation period.

The dividing unit 210 is further configured to divide, based on a width of the frequency band, one time domain symbol or several consecutive time domain symbols within the resource allocation period into at least one resource block, where each resource block in the at least one resource block is a training resource block in a frequency band in which the resource block is located.

Preferably, the one time domain symbol or several consecutive time domain symbols are located at a beginning part of the resource allocation period.

The determining unit 220 is configured to determine user equipment eligible to occupy the training resource block, where the user equipment are corresponding to an uplink data time-frequency resource already allocated to the frequency band.

Within each resource allocation period, a frequency band may be occupied by different user equipment within different periods of time, and therefore, user equipment that occupy a same frequency band at different periods of time within the resource allocation period are all eligible to occupy a training resource block in the frequency band. It may be determined according to an uplink data time-frequency resource already allocated to the frequency band whether user equipment occupies a frequency band within a period of time. Therefore, the determining unit 220 determines user equipment eligible to occupy the training resource block, where the user equipment are corresponding to the uplink data time-frequency resource already allocated to the frequency band.

The allocation unit 230 is configured to determine, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block, and allocate the training resource block to the user equipment.

Optionally, the allocation unit 230 allocates a training resource block in the frequency band to user equipment occupying the frequency band for the longest duration within the resource allocation period, in the user equipment eligible to occupy the training resource block.

If the user equipment eligible to occupy the training resource block occupy the frequency band for same duration within the resource allocation period, the allocation unit 230 allocates the training resource block in the frequency band to user equipment having the longest duration from a previous time of occupation of a training resource block in the frequency band, in the user equipment eligible to occupy the training resource block.

It should be noted that a training resource block occupied by user equipment at a previous time in the frequency band is a training resource block allocated within at least one previous resource allocation period. A training resource block is reallocated within each resource allocation period. Therefore, a training resource block occupied by user equipment at a previous time in the frequency band is different from a training resource block allocated within a current resource allocation period.

Optionally, duration for which the user equipment eligible to occupy the training resource block occupy the frequency band may be not considered, and the allocation unit 230 allocates the training resource block based only on duration of the user equipment eligible to occupy the training resource block from a previous time of occupation of training resource blocks in the frequency band in which the user equipment are located.

The allocation unit 230 allocates the training resource block in the frequency band to user equipment having the longest duration from a previous time of occupation of a training resource block in the frequency band, in the user equipment eligible to occupy the training resource block.

However, when the user equipment eligible to occupy the training resource block have same duration from a previous time of occupation of training resource blocks in the frequency band, the allocation unit 230 may allocate the training resource block to user equipment occupying the frequency band for the longest duration within the resource allocation period, in the user equipment eligible to occupy the training resource block.

Optionally, duration for which the user equipment eligible to occupy the training resource block occupy the frequency band and duration of the user equipment eligible to occupy the training resource block from a previous time of occupation of training resource blocks in the frequency band may be further considered in combination.

Furthermore, the allocation unit 230 determines whether duration for which each user equipment in the user equipment eligible to occupy the training resource block occupies the frequency band within the resource allocation period exceeds a preset first time threshold, determines whether duration of each user equipment, in the user equipment eligible to occupy the training resource block, from a previous time of occupation of a training resource block in the frequency band exceeds a preset second time threshold. If the user equipment eligible to occupy the training resource block include user equipment that occupies the frequency band within the resource allocation period for duration exceeding the first time threshold and do not include user equipment having duration, from a previous time of occupation of a training resource block in the frequency band, exceeding the second time threshold, allocates the training resource block to user equipment occupying the frequency band for the longest duration within the resource allocation period, in the user equipment eligible to occupy the training resource block. If the user equipment eligible to occupy the training resource block include user equipment having duration, from a previous time of occupation of a training resource block in the frequency band, exceeding the second time threshold and do not include user equipment that occupies the frequency band within the resource allocation period for duration exceeding the first time threshold, allocates the training resource block to user equipment, having the longest duration from a previous time of occupation of a training resource block in the frequency band, in the user equipment eligible to occupy the training resource block. If the user equipment eligible to occupy the training resource block do not include user equipment that occupies the frequency band within the resource allocation period for duration exceeding the first time threshold and do not include user equipment having duration, from a previous time of occupation of a training resource block in the frequency band, exceeding the second time threshold, or the user equipment eligible to occupy the training resource block include user equipment that occupies the frequency band within the resource allocation period for duration exceeding the first time threshold and also include user equipment having duration, from a previous time of occupation of a training resource block in the frequency band, exceeding the second time threshold, allocates the training resource block to user equipment occupying the frequency band for the longest duration within the resource allocation period, in the user equipment eligible to occupy the training resource block. When the user equipment eligible to occupy the training resource block occupy the frequency band for same duration within the resource allocation period, allocates the training resource block in the frequency band to user equipment having the longest duration from a previous time of occupation of a training resource block in the frequency band, in the user equipment eligible to occupy the training resource bloc, or allocates the training resource block in the frequency band to user equipment having the longest duration from a previous time of occupation of a training resource block in the frequency band, in the user equipment eligible to occupy the training resource block, and when the user equipment eligible to occupy the training resource block have same duration from a previous time of occupation of a training resource block in the frequency band, may allocate the training resource block to user equipment occupying the frequency band for the longest duration within the resource allocation period, in the user equipment eligible to occupy the training resource block.

By means of the training resource allocation apparatus according to Embodiment 2 of the present disclosure, a training resource block is obtained through division for each frequency band within each resource allocation period, user equipment eligible to occupy the training resource block are determined according to user equipment corresponding to an uplink data time-frequency resource already allocated to the frequency band, and the training resource block is then allocated to user equipment in the user equipment eligible to occupy the training resource block. The apparatus obtains a training resource block through division for each frequency band within each resource allocation period. Therefore, impact of uplink channel training on other online users can be reduced. Moreover, history information can be effectively used to perform uplink channel training, that is, to perform uplink channel training of the some frequency bands on user equipment that uses a current frequency band. It can be accordingly seen that the apparatus is applicable to a point-to-multipoint system, and a relatively small quantity of time-frequency resources can be used to implement accurate uplink channel training, thereby improving spectrum utilization.

In hardware implementation, the dividing unit 210, the determining unit 220, and the allocation unit 230 above may be built in or independent of a processor of the network device in the form of hardware, or may be stored in a memory of the network device in the form of software, so that the processor invokes and executes operations corresponding to the foregoing modules. The processor may be a central processing unit (CPU), a microprocessor, a single-chip microcomputer, and the like.

Figure 5:
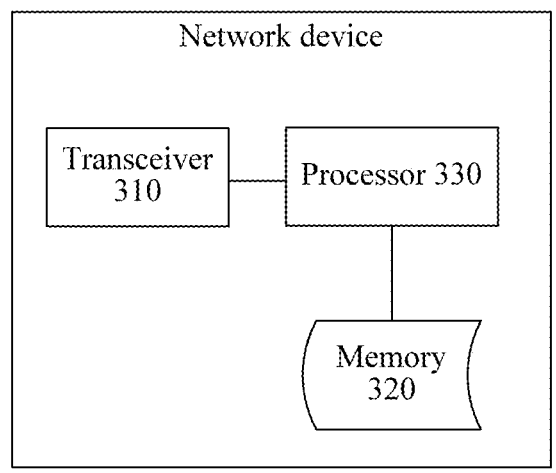
FIG. 5 is a schematic structural diagram of a network device according to Embodiment 3 of the present disclosure.

As shown in FIG. 5, FIG. 5 is a schematic structural diagram of a network device according to Embodiment 3 of the present disclosure. The network device is configured to implement the training resource allocation method according to Embodiment 1. The network device includes a transceiver 310, a memory 320, and a processor 330 connected to the transceiver 310 and the memory 320.

The memory 320 stores a set of program code, and the processor 330 is configured to invoke the program code stored in the memory 320, to execute the following operations: obtaining a training resource block through division for a frequency band within a resource allocation period, determining user equipment eligible to occupy the training resource block, where the user equipment are corresponding to an uplink data time-frequency resource already allocated to the frequency band, and determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block, and allocating the training resource block to the user equipment.

Further, the obtaining a training resource block through division for a frequency band within a resource allocation period further includes dividing, based on a width of the frequency band, one time domain symbol or several consecutive time domain symbols within the resource allocation period into at least one resource block, where each resource block in the at least one resource block is a training resource block in a frequency band in which the resource block is located.

Further, the one time domain symbol or several consecutive time domain symbols are located at a beginning part of the resource allocation period.

Further, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block further includes allocating the training resource block to user equipment occupying the frequency band for the longest duration within the resource allocation period, in the user equipment eligible to occupy the training resource block.

Further, when the user equipment eligible to occupy the training resource block occupy the frequency band for same duration within the resource allocation period, the training resource block is allocated to user equipment having the longest duration from a previous time of occupation of a training resource block in the frequency band, in the user equipment eligible to occupy the training resource block.

Further, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block further comprises allocating the training resource block to user equipment having the longest duration from a previous time of occupation of a training resource block in the frequency band, in the user equipment eligible to occupy the training resource block.

Further, when the user equipment eligible to occupy the training resource block have same duration from a previous time of occupation of a training resource block in the frequency band, the training resource block is allocated to user equipment occupying the frequency band for the longest duration within the resource allocation period, in the user equipment eligible to occupy the training resource block.

Further, the determining, according to at least one of duration for which user equipment occupies the frequency band within the resource allocation period and duration of the user equipment from a previous time of occupation of a training resource block in the frequency band, from the user equipment eligible to occupy the training resource block, user equipment that occupies the training resource block is further includes: determining whether duration for which each user equipment in the user equipment eligible to occupy the training resource block occupies the frequency band within the resource allocation period exceeds a preset first time threshold, determining whether duration of each user equipment, in the user equipment eligible to occupy the training resource block, from a previous time of occupation of a training resource block in the frequency band exceeds a preset second time threshold. If the user equipment eligible to occupy the training resource block include user equipment that occupies the frequency band within the resource allocation period for duration exceeding the first time threshold and do not include user equipment having duration, from a previous time of occupation of a training resource block in the frequency band, the step includes exceeding the second time threshold, allocating the training resource block to user equipment, occupying the frequency band for the longest duration within the resource allocation period, in the user equipment eligible to occupy the training resource block. Furthermore, if the user equipment eligible to occupy the training resource block include user equipment having duration, from a previous time of occupation of a training resource block in the frequency band, exceeding the second time threshold and do not include user equipment that occupies the frequency band within the resource allocation period for duration exceeding the first time threshold, the step includes allocating the training resource block to user equipment, having the longest duration from a previous time of occupation of a training resource block in the frequency band, in the user equipment eligible to occupy the training resource block.

By means of the network device according to Embodiment 3 of the present disclosure, a training resource block is obtained through division for each frequency band within each resource allocation period, user equipment eligible to occupy the training resource block are determined according to user equipment corresponding to an uplink data time-frequency resource already allocated to the frequency band, and the training resource block is then allocated to user equipment in the user equipment eligible to occupy the training resource block. The network device obtains a training resource block through division for each frequency band within each resource allocation period. Therefore, impact of uplink channel training on other online users can be reduced. Moreover, history information can be effectively used to perform uplink channel training, that is, to perform uplink channel training of the some frequency bands on user equipment that uses a current frequency band. It can be accordingly seen that the network device is applicable to a point-to-multipoint system, and a relatively small quantity of time-frequency resources can be used to implement accurate uplink channel training, thereby improving spectrum utilization.

Figure 6:
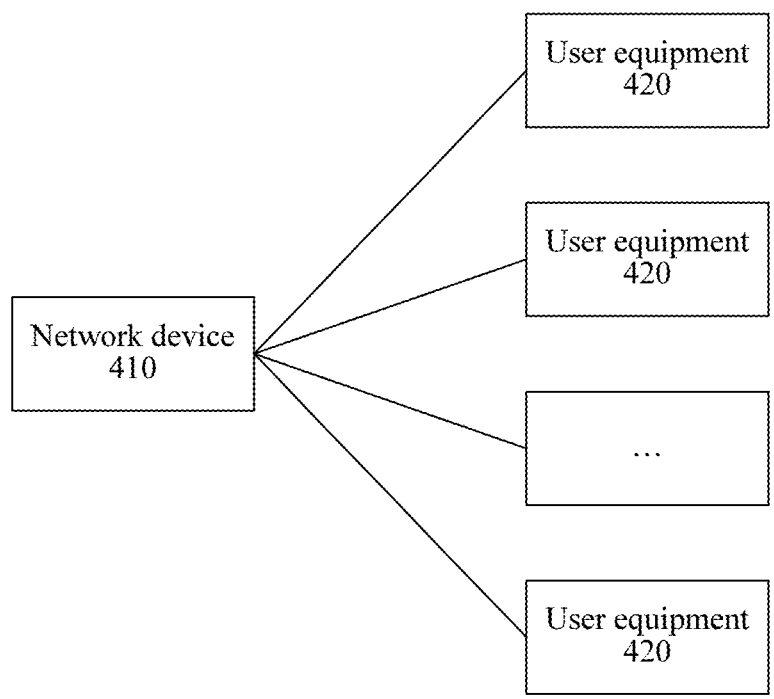
FIG. 6 is a schematic structural diagram of a training resource allocation system according to Embodiment 4 of the present disclosure.

A training resource allocation system according to Embodiment 4 of the present disclosure is described in detail below using FIG. 6 as an example. FIG. 6 is a schematic structural diagram of the training resource allocation system according to Embodiment 4 of the present disclosure.

As shown in FIG. 6, the training resource allocation system includes a network device 410 and at least one user equipment 420.

The network device 410 is configured to implement the training resource allocation method according to Embodiment 1, and allocate a training resource to the user equipment 420, so that the user equipment 420 performs communication using the training resource allocated by the network device 410.

By means of the training resource allocation system according to Embodiment 4 of the present disclosure, a network device obtains a training resource block through division for each frequency band within each resource allocation period, determines user equipment eligible to occupy the training resource block according to user equipment corresponding to an uplink data time-frequency resource already allocated to the frequency band, and then allocates the training resource block to user equipment in the user equipment eligible to occupy the training resource block. The network device obtains a training resource block through division for each frequency band within each resource allocation period. Therefore, impact of uplink channel training on other online users can be reduced. Moreover, history information can be effectively used to perform uplink channel training, that is, to perform uplink channel training of the some frequency bands on user equipment that uses a current frequency band. It can be accordingly seen that the network device is applicable to a point-to-multipoint system, and a relatively small quantity of time-frequency resources can be used to implement accurate uplink channel training, thereby improving spectrum utilization.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable disk, a compact disc (CD)-ROM, or a storage medium in any other form well known in the art.

In the foregoing specific implementation manners, the objective, technical solutions, and beneficial effects of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A training resource allocation method for performing uplink channel training in a point-to-multipoint system, the method comprising:
   obtaining, through division of one or more time domain symbols within a resource allocation period, a training resource block for a frequency band;
   determining a plurality of user equipment corresponding to uplink data time-frequency resources already allocated to the frequency band;
   determining, from the plurality of user equipment, first user equipment allocated to occupy the frequency band a longest duration subsequent to the training resource block within the resource allocation period as user equipment to occupy the training resource block; and
   allocating the training resource block to the first user equipment.

2. The method of claim 1, wherein the one or more time domain symbols correspond to one time domain symbol or multiple consecutive time domain symbols, obtaining the training resource block through division comprises dividing the one time domain symbol or the multiple consecutive time domain symbols within the resource allocation period into at least one resource block based on a width of the frequency band, and each resource block in the at least one resource block is a training resource block in a frequency band in which the resource block is located.

3. The method of claim 2, wherein the one time domain symbol or the multiple consecutive time domain symbols are located at a beginning part of the resource allocation period.

4. The method of claim 1, wherein when the plurality of user equipment are allocated to occupy the frequency band for a same duration within the resource allocation period, the training resource block is further allocated to the first user equipment based on duration from a previous time of occupation, by the first user equipment, of a training resource block in the frequency band.

5. A training resource allocation apparatus, comprising:
   a memory storing instructions; and
   a processor coupled to the memory, the instructions causing the processor to be configured to:
      obtain, through division of one or more time domain symbols within a resource allocation period, a training resource block for a frequency band;
      determine a plurality of user equipment corresponding to uplink data time-frequency resources already allocated to the frequency band;
      determine, from the plurality of user equipment, first user equipment allocated to occupy the frequency band for a longest duration subsequent to the training resource block within the resource allocation period as user equipment to occupy the training resource block; and
      allocate the training resource block to the first user equipment.

6. The apparatus of claim 5, wherein the one or more time domain symbols correspond to one time domain symbol or multiple consecutive time domain symbols, the processor is further configured to obtain the training resource block by dividing the one time domain symbol or the multiple consecutive time domain symbols within the resource allocation period into at least one resource block based on a width of the frequency band, each resource block in the at least one resource block is the training resource block in the frequency band in which the resource block is located.

7. The apparatus of claim 6, wherein the one time domain symbol or the multiple consecutive time domain symbols are located at a beginning part of the resource allocation period.

8. The apparatus of claim 5, wherein when the plurality of user equipment occupy the frequency band for a same duration within the resource allocation period, the processor is further configured to allocate the training resource block to the first user equipment based on duration from a previous time of occupation, by the first user equipment, of a training resource block in the frequency band.

9. A training resource allocation system, comprising:
   at least one user equipment; and
   a training resource allocation apparatus configured to communicate with the at least one user equipment, the training resource allocation apparatus comprising:
      a memory; and a processor coupled to the memory and configured to:
  obtain, through division of one or more time domain symbols within a resource allocation period, a training resource block for a frequency band;
  determine a plurality of user equipment corresponding to an uplink data time-frequency resource already allocated to the frequency band;
  determine, from the plurality of user equipment, first user equipment allocated to occupy the frequency band for a longest duration subsequent to the training resource block within the resource allocation period as user equipment to occupy the training resource block; and
  allocate the training resource block to the first user equipment.

10. A training resource allocation method, comprising:
obtaining, through division of one or more time domain symbols within a resource allocation period, a training resource block for a frequency band;
determining a plurality of user equipment eligible to occupy the training resource block, the plurality of user equipment corresponding to an uplink data time-frequency resource already allocated to the frequency band;
determining whether a duration for which each user equipment in the plurality of user equipment eligible to occupy the training resource block occupies the frequency band within the resource allocation period exceeds a preset first time threshold;
determining whether a duration of each user equipment, in the plurality of user equipment eligible to occupy the training resource block, from a previous time of occupation of the training resource block in the frequency band exceeds a preset second time threshold;
allocating the training resource block to user equipment occupying the frequency band for the longest duration within the resource allocation period when the plurality of user equipment eligible to occupy the training resource block comprise user equipment that occupies the frequency band within the resource allocation period for a duration exceeding the preset first time threshold and do not comprise user equipment having a duration, from the previous time of occupation of the training resource block in the frequency band, exceeding the preset second time threshold; and
allocating the training resource block to user equipment having the longest duration from a previous time of occupation of a training resource block in the frequency band when the plurality of user equipment eligible to occupy the training resource block comprise user equipment having a duration, from the previous time of occupation of the training resource block in the frequency band, exceeding the preset second time threshold and do not comprise user equipment that occupies the frequency band within the resource allocation period for a duration exceeding the preset first time threshold.

11. The method of claim 10, wherein the one or more time domain symbols correspond to one time domain symbol or multiple consecutive time domain symbols, and wherein obtaining the training resource block through division comprises dividing the one time domain symbol or the multiple consecutive time domain symbols within the resource allocation period into at least one resource block based on a width of the frequency band, each resource block in the at least one resource block is a training resource block in a frequency band in which the resource block is located.

12. The method of claim 11, wherein the one time domain symbol or the multiple consecutive time domain symbols are located at a beginning part of the resource allocation period.

13. A training resource allocation apparatus, comprising;
a memory storing instructions; and
a processor coupled to the memory, the instructions causing the processor to be configured to:
  obtain, through division of one or more time domain symbols within a resource allocation period, a training resource block for a frequency band;
  determine a plurality of user equipment eligible to occupy the training resource block, the plurality of user equipment corresponding to an uplink data time-frequency resource already al located to the frequency band;
  determine whether a duration for which each user equipment in the plurality of user equipment eligible to occupy the training resource block occupies the frequency band within the resource allocation period exceeds a preset first time threshold;
  determine whether a duration of each user equipment, in the plurality of user equipment eligible to occupy the training resource block, from a previous time of occupation of the training resource block in the frequency band exceeds a preset second time threshold;
  allocate the training resource block to user equipment occupying the frequency band for the longest duration within the resource allocation period when the plurality of user equipment eligible to occupy the training resource block comprise user equipment that occupies the frequency band within the resource allocation period for a duration exceeding the preset first time threshold and do not comprise user equipment having a duration, from the previous time of occupation of the training resource block in the frequency band, exceeding the preset second time threshold; and
  allocate the training resource block to user equipment having the longest duration from the previous time of occupation of the training resource block in the frequency band when the plurality of user equipment eligible to occupy the training resource block comprise user equipment having a duration, from the previous time of occupation of the training resource block in the frequency band, exceeding the preset second time threshold and do not comprise user equipment that occupies the frequency band within the resource allocation period for a duration exceeding the preset first time threshold.

14. The apparatus of claim 13, wherein the one or more time domain symbols correspond to one time domain symbol or multiple consecutive time domain symbols, and wherein the processor is configured to obtain the training resource block through division by being configured to divide the one time domain symbol or the multiple consecutive time domain symbols within the resource allocation period into at least one resource block based on a width of the frequency band, each resource block in the at least one resource block is a training resource block in a frequency band in which the resource block is located.

15. The apparatus of claim 14, wherein the one time domain symbol or the multiple consecutive time domain symbols are located at a beginning part of the resource allocation period.

* * * * *

UNITED STATES PATENT AND TRADEMARK OFFICE
CERTIFICATE OF CORRECTION

PATENT NO. : 10,257,823 B2
APPLICATION NO. : 15/047761
DATED : April 9, 2019
INVENTOR(S) : Xiaofeng Zhang Page 1 of 1

It is certified that error appears in the above-identified patent and that said Letters Patent is hereby corrected as shown below:

In the Claims

Column 17, Line 63: insert --for-- before "a longest duration"

Column 18, Line 46: insert --and-- before "each resource"

Column 20, Line 14: "al located" should read "allocated"

Signed and Sealed this
Eighteenth Day of June, 2019

Andrei Iancu
*Director of the United States Patent and Trademark Office*